United States Patent [19]

Lindh et al.

[11] Patent Number: 5,868,801
[45] Date of Patent: Feb. 9, 1999

[54] METHOD FOR APPLYING A PATTERN ON TO A THERMOPLASTIC WORKPIECE AND AN OBJECT PRODUCED ACCORDING TO THE METHOD

[75] Inventors: Leif Lindh, Danderyd; Kjell Lindh, Lidingö; Urban Holm, Skärholmen, all of Sweden

[73] Assignee: Viktor Begat AB, Anderstorp, Sweden

[21] Appl. No.: 750,526

[22] PCT Filed: Jun. 13, 1995

[86] PCT No.: PCT/SE95/00715

§ 371 Date: Jan. 31, 1997

§ 102(e) Date: Jan. 31, 1997

[87] PCT Pub. No.: WO95/34420

PCT Pub. Date: Dec. 21, 1995

[30] Foreign Application Priority Data

Jun. 15, 1994 [SE] Sweden .................................. 9402109

[51] Int. Cl.$^6$ ..................................................... B29C 51/00
[52] U.S. Cl. ........................... 8/471; 8/508; 8/509; 8/512; 156/277; 156/289; 264/129; 264/340; 264/553; 428/207; 428/914

[58] Field of Search ..................................... 101/467, 470; 8/471, 508, 509, 512; 250/318; 264/129, 553, 340; 156/277, 289; 428/207, 914

[56] References Cited

U.S. PATENT DOCUMENTS 4,202,663  5/1980  Haigh et al. ................................. 8/471

*Primary Examiner*—Laurie Scheiner
*Attorney, Agent, or Firm*—Young & Thompson

[57] ABSTRACT

The present invention concerns a method for the application of a pattern on a work piece of thermoplastic material, preferably plastic, in which method a material, preferably fabric, carrying a predetermined pattern, is brought into contact against said work piece, that the plastic material is heated to a predetermined temperature, and that said patterned material is allowed to remain in contact with the plastic material for a predetermined time, so that the pattern is completely or partly taken up by the work piece, whereupon said pattern carrying material is removed, a method for the production of an object from the work piece with simultaneous application of the pattern, as well as an object produced according to the method.

10 Claims, No Drawings

METHOD FOR APPLYING A PATTERN ON TO A THERMOPLASTIC WORKPIECE AND AN OBJECT PRODUCED ACCORDING TO THE METHOD

The present invention concerns a method for applying a pattern onto a work piece made of thermoplastic material, shaping the work piece to make an object, as well as an object produced by means of the method.

It is known from U.S. Pat. No. 4,202,663 how to transfer patterns to a object made of plastic by pacing a polyolefin film between a colour transfer paper and a sheet of thermoplastic material. Heating takes place to a sufficient degree for the colour to sublimate through the plastic film and the colour to be absorbed by the plastic sheet with possible pattern intact. The materials subsequently cool down and are separated whereby a decorated sheet is made. This colouring methods can also be used in connection with shaping of objects, so called "in-mold decoration". The disadvantage with this method is that several lasters must be laid onto the article which is to be patterned and possibly shaped, and after the process these two layers must on the other hand be discarded.

The invention concerns more precisely a method, by which an object of thermoplastic material of the type polyethylene, polypropylene, polystyrene, ABS-plastic etc. is furnished with a pattern at the same time as a possible shaping of the object takes place.

The property, which makes thermoplastics usable in mans situations, is the property of these plastics becoming plastic when heated, which depends on the forces between the linear macromolecules in the plastics reducing at elevated temperatures. In this connection the plastic becomes more or less deformable under pressure. These plastics regain their original properties when cooled to normal temperatures. The usual way s to shape these plastics are to vacuum form or press the material under pressure into or onto a mould and then let the plastic cool down before the mould is taken away.

Thermoplastics are used in man areas where shaping of materials to form objects is an integral part. In orthopaedic technology different types of thermoplastics are used to produce rigid objects which are included in prostheses and other aids, i.e. they are rigid in comparison to soft parts made of fabric or another material. The object can e.g. consist of a brace or the like. The way to produce these objects consists mainly in that a mould, e.g. made of plaster, is made of the part in question, wherein this mould is individually adjusted to fit the person who will use the manufactured aid.

Once the mould is produced the object is shaped from some thermoplastic material. e.g. one of the above mentioned plastics. This shaping takes place through heating up the thermoplastic material to the temperature at which the material in question can be shaped either through vacuum forming or through the thermoplastic being laid over the prepared plaster mould and being shaped manually.

The above named thermoplastic materials can be obtained either in uncoloured or coloured state. Even if the material is functional and the objects which arc produced function satisfactorily they often do not give a completely, satisfactory visual impression. Especially when the manufactured shaped objects are included in orthopaedic aids for children it would be desirable to give the objects an aesthetically more attractive appearance.

It has no surprisingly been shown that through heating up a thermoplastic work piece, letting it lie in contact with a patterned fabric, which naturally must withstand temperature received during the heating up without itself being destroyed, the pattern is transferred to the heated thermoplastic. The thermoplastic work piece in this method is preferably in the form of a sheet. It is also conceivable to use as the pattern carrying material another heat resistant material with properties corresponding to those of fabric.

The fabric which during the heating up is brought into contact against the sheet shaped plastic material is advantageously made of a stretch material e.g. lycra. The heating up can take place in a press, in which heat can be applied from both or just one side. In one embodiment the pattern is applied through heating from the side against which the fabric is in contact. i.e. the heat contributes to the pattern on the fabric migrating into the plastic material with the heat.

The reason why the fabric which is used in the method should be made of a stretch fabric or similarly formable material provided with a pattern is that no part of the material provided with a pattern shall move relative to the plastic during the forming process, i.e. no crease or the like should arise. The shaping of the sheet shaped plastic work piece which is heated together with the fabric can e.g. take place through the work piece with the fabric being shaped around a plaster mould or a mould of another material. With plaster moulds padding can be attached as required to make the manufactured object more comfortable to wear. The padding in itself is however not necessary to accomplish the method itself. The heated, sheet shaped work piece is laid upon the padding on the face facing away from the mould the material provided with a pattern is placed with the pattern around the plastic work piece. The plastic work piece is heated to approx. 200° C. or the temperature appropriate for the respective plastic, so that it can be manually shaped around the padded plaster mould with the help of heat-resistant gloves. The plastic is subsequently allowed to cool and stiffen into its new shape.

The shaping of the object can also take place by the plastic and the fabric lying in contact with the plastic being fixed in a frame, heated and placed over a mould, thereafter vacuum is applied and the plastic is shaped around the mould. Subsequently, the plastic is allowed to cool down.

In the above shaping method the fabric is in contact with the thermoplastic the whole time during shaping and for a determined time after shaping. It has been shown that the transferring of the pattern to the thermoplastic is time dependent, i.e. the longer the time the pattern lies in contact against the plastic, the more of the colour from the pattern transfers to the plastic. The amount of penetration into the plastic is also a function of time and possibly also of the heating temperature.

Once the desired level of pattern transfer has been reached the fabric is taken away from the shaped part.

A further effect results from the use of the above described stretch material in that a simple structural influence is achieved on the usually shin and smooth plastic material. This means that the manufactured part has an aesthetically attractive appearance and a tactually more pleasing surface, partly because of the transferred pattern and partly because the surface of the object is still indeed hard but because of the textured effect it gives a softer impression.

It is of course possible to first give the object made from thermoplastic its final shape and then bring the deformable pattern carrying material into contact with the shaped object with simultaneous heating and letting the pattern be transferred with the latter process. In this connection, the time and process simplicity advantages which the above mentioned process permits, namely that the pattern carrying material during the shaping of the object displays a slight adhesion to the object and thereby a transfers its texture and the pattern point for point to the object, are not obtained.

The method according to the invention, which has been described above with reference to the described embodiments can, of course be modified within the frame of the attached patent claims with reference to the description.

We claim:

1. Method for applying a pattern to a thermoplastic workpiece, comprising placing a single sheet of pattern-bearing fabric in direct contact with said workpiece, heating said workpiece at a predetermined temperature while allowing said pattern-bearing fabric to remain in contact with said workpiece for a predetermined time to effect transfer of said pattern to said workpiece, and removing said fabric from said workpiece.

2. The method according to claim 1, wherein said heating step is performed with said fabric and said workpiece sandwiched in a press, with heat applied from a side adjacent said fabric.

3. The method according to claim 1, wherein said thermoplastic workpiece is a plastic material selected from the group consisting of polyethylene, polypropylene, polystyrene and ABS plastic.

4. The method according to claim 1, wherein said fabric is a stretch material.

5. The method according to claim 4, wherein said stretch material is lycra.

6. The method according to claim 1, wherein said thermoplastic workpiece is initially heated prior to said placing step.

7. Method for applying a pattern to a thermoplastic workpiece, comprising heating said workpiece, placing a single sheet of pattern-bearing material in direct contact with said heated workpiece, further heating said workpiece and said material at a predetermined temperature and for a predetermined time to effect transfer of said patter from said material to said workpiece, and removing said sheet of material from said workpiece.

8. The method according to claim 7, further comprising shaping said workpiece to a desired final shape prior to said placing step.

9. The method according to claim 7, wherein said thermoplastic workpiece is a plastic selected from the group consisting of polyethylene, polypropylene, polystyrene and ABS plastic.

10. The method according to claim 7, wherein said predetermined temperature is about 200° C.

* * * * *